US008134988B2

(12) United States Patent
Banerjea et al.

(10) Patent No.: US 8,134,988 B2
(45) Date of Patent: Mar. 13, 2012

(54) COEXISTENCE MECHANISM FOR WIMAX AND IEEE 802.11

(75) Inventors: Raja Banerjea, Sunnyvale, CA (US); Harish Ramamurthy, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 465 days.

(21) Appl. No.: 12/388,831

(22) Filed: Feb. 19, 2009

(65) Prior Publication Data

US 2009/0245216 A1  Oct. 1, 2009

Related U.S. Application Data

(60) Provisional application No. 61/039,931, filed on Mar. 27, 2008.

(51) Int. Cl.
*H04W 88/06* (2009.01)
(52) U.S. Cl. ...................... 370/338; 455/552.1
(58) Field of Classification Search .......... None
See application file for complete search history.

(56) References Cited

U.S. PATENT DOCUMENTS

| 6,842,607 | B2 | 1/2005 | Godfrey | |
|---|---|---|---|---|
| 7,117,008 | B2 | 10/2006 | Bajikar | |
| 7,643,463 | B1* | 1/2010 | Linsky et al. | 370/344 |
| 2006/0292987 | A1 | 12/2006 | Ophir et al. | |
| 2007/0124443 | A1* | 5/2007 | Nanda et al. | 709/223 |
| 2007/0153749 | A1 | 7/2007 | Waxman | |
| 2008/0144493 | A1* | 6/2008 | Yeh | 370/230 |
| 2008/0167069 | A1* | 7/2008 | Bridgelall | 455/553.1 |
| 2008/0238807 | A1* | 10/2008 | Ibrahim et al. | 343/876 |
| 2009/0017756 | A1* | 1/2009 | Tsfaty et al. | 455/41.2 |
| 2010/0153807 | A1* | 6/2010 | Kakani | 714/749 |

OTHER PUBLICATIONS

Notification of Transmittal of The International Search Report and The Written Opinion of the International Searching Authority, or The Declaration dated Jul. 30, 2009 in reference to PCT/US2009/036116 (13 pgs).
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.
IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Min Jung (57) ABSTRACT

A network device includes a first communication module and a second communication module. The first communication module communicates with a first device using a first wireless communication standard. The first communication module receives data from the first device during a first time period and transmits data to the first device during a second time period. The second communication module communicates with a second device using a second wireless communication standard. The second communication module receives a block of packets from the second device during the first time period. The second communication module transmits an acknowledgement to the second device during the second time period when the block of the packets is received.

14 Claims, 5 Drawing Sheets

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; 131 pages.

IEEE Std 802.16-2001 IEEE Standard for Local and metropolitan area networks; Part 16: Air Interface for Fixed Broadband Wireless Access Systems; IEEE Computer Society and the IEEE Microwave Theory and Techniques Society; Apr. 8, 2002; 349 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.16a (Amendment to IEEE Std 802.16-2001) IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; IEEE Computer Society and the IEEE Microwave Theory and Techniques Society; Apr. 1, 2003; 316 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

Specification of the Bluetooth System Master Table of Contents & Compliance Requirements; Covered Core Package version: 2.0 + EDR Current Master TOC issued: Nov. 4, 2004; pp. 1-72; pp. 1-92; pp. 1-812.

PCT Notification of Transmittal of the International Search Report and the Written Opinion of the International Searching Authority dated May 14, 2007 for Application No. PCT/US2006/046986; 10 pages.

U.S. Appl. No. 60/983,720, filed Oct. 30, 2007; "Coexistence Using Intelligent Suppression of the BT Slot so as to Receive Packets from the Wireless LAN AP"; Chhabra et al.; 2 pages.

U.S. Appl. No. 61/068,752, filed Mar. 10, 2008; "Marvell AMP 802.11 and WIMAX Coexistence"; Banerjea; 19 pages.

* cited by examiner

COEXISTENCE MECHANISM FOR WIMAX AND IEEE 802.11

CROSS-REFERENCE TO RELATED APPLICATIONS

This application claims the benefit of U.S. Provisional Application No. 61/039,931, filed on Mar. 27, 2008. The disclosure of the above application is incorporated herein by reference in its entirety.

FIELD

The present disclosure relates to wireless network devices, and more particularly to devices that communicate using multiple communication standards.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
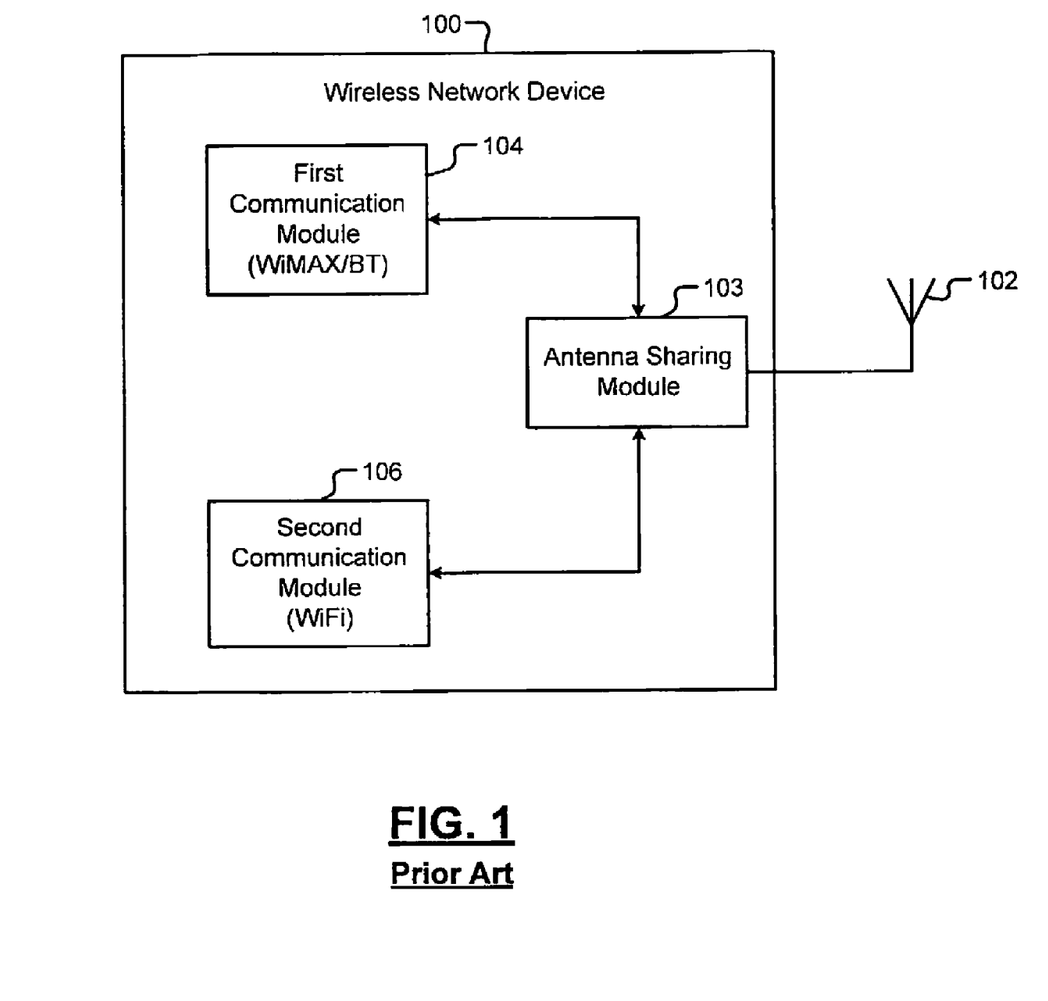
FIG. 1 is a functional block diagram of a wireless network device according to the prior art.

Referring now to FIG. 1, a handheld wireless network device (device) 100 may comprise an antenna 102, an antenna sharing module 103, a first communication module 104, and a second communication module 106. The first and second communication modules 104, 106 may communicate using different wireless communication standards (standards). Accordingly, the device 100 is said to communicate using collocated communication modules that use different communication standards.

For example only, the first communication module 104 may communicate using a Fourth Generation (4G) standard or a Bluetooth® (BT) standard. The 4G standard may include Worldwide Interoperability for Microwave Access (WiMAX), Third Generation Partnership Project (3GPP) Long Term Evolution (LTE), or Ultra Mobile Band (UMB) standard. Throughout the disclosure, the WiMAX standard is used as an example only. However, the discussion is applicable to other 4G standards and the BT standard.

The second communication module 106 may communicate using one of the I.E.E.E. 802.11 communication standards. For example only, the second communication module 106 may communicate using a wireless fidelity (WiFi) standard that uses the I.E.E.E. 802.11 specification. Alternatively, the second communication module 106 may communicate using BT with an Alternative Medium access controller (MAC) and Physical layer (PHY) (i.e., BT-AMP) technology. The BT-AMP technology enables BT to support data rates of up to 24 Megabits per second (Mbps) and increases range by using other wireless radio technologies, such as the I.E.E.E. 802.11, as transport medium.

The first communication module 104 using one of the 4G standards (e.g., the WiMAX standard) typically communicates via 2.5 GHz and 2.3 GHz frequency bands. The second communication module 106 typically communicates via the Industrial, Scientific, and Medical (ISM) frequency band of 2.4 GHz. The first and second communication modules 104, 106 may share the antenna 102 via the antenna sharing module 103. Although the antenna 102 is shown as a single antenna, the device 100 may comprise multiple antennas that may be shared by the first and second communication modules 104, 106. Accordingly, data received by the first communication module 104 may occasionally interfere with the data transmitted by the second communication module 106, and vice versa.

For example, data received by the first communication module 104 from a WiMAX base station (BS) (not shown) may interfere with data transmitted by the second communication module 106 to a remote WiFi device (not shown). The remote WiFi device may include an access point (AP) or a client station. The interference may cause the WiMAX BS to drop the data rate of transmission. Dropping the data rate may increase the duration of the transmitted packets. Increasing the duration of the transmitted packets may, in turn, increase the interference. If the interference exceeds a predetermined threshold, the device 100 may be disconnected from the WiMAX BS.

Additionally, data received by the second communication module 106 from the remote WiFi device may interfere with data transmitted by the first communication module 104 to the WiMAX BS. The interference may cause the remote WiFi device to drop the data rate of transmission. Dropping the data rate may increase the duration of the transmitted packets. Increasing the duration of the transmitted packets may, in turn, increase the interference. If the interference exceeds a predetermined threshold, the device 100 may be disconnected from the remote WiFi device.

Figure 2:
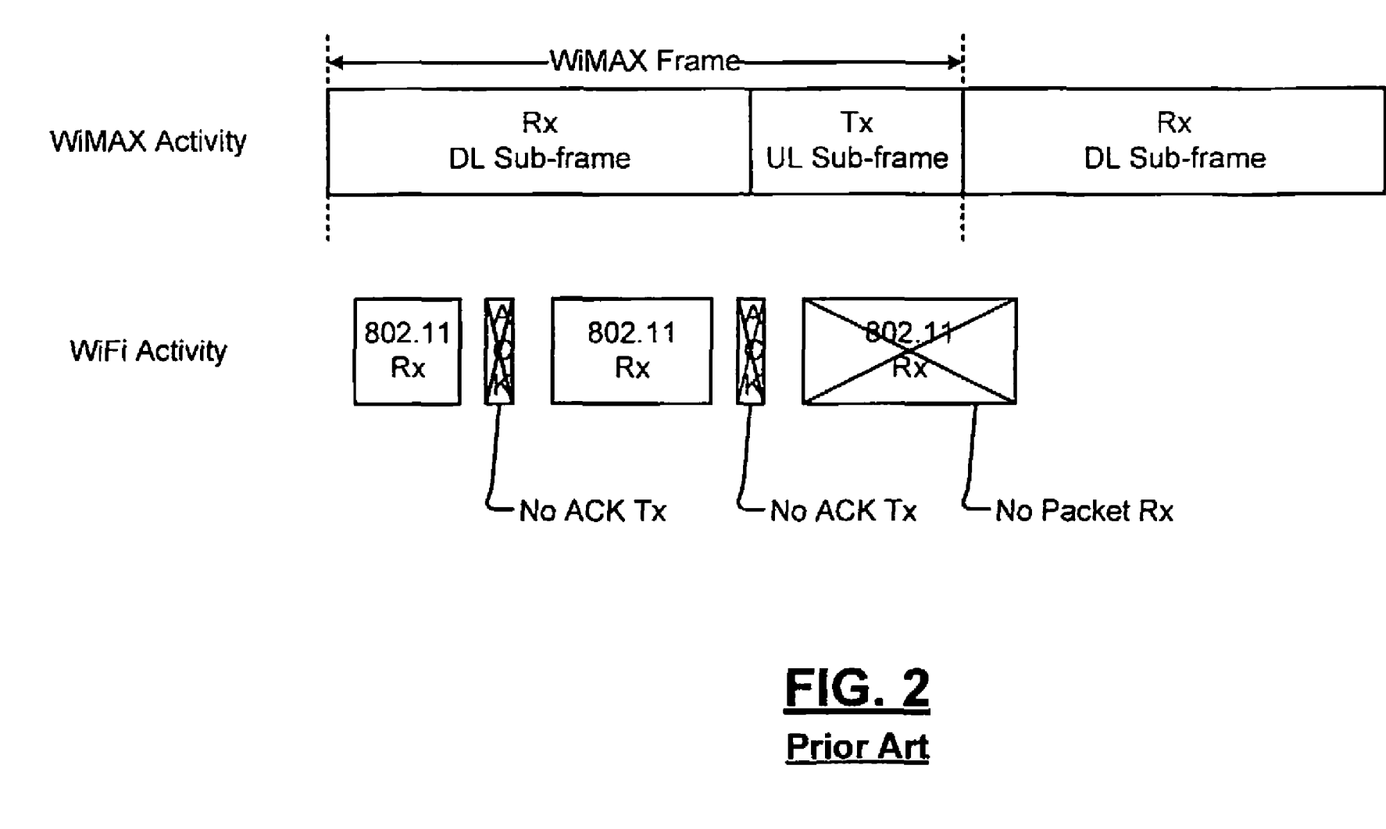
FIG. 2 is a timing diagram of signals exchanged by the wireless network device of FIG. 1, a WiMAX base station, and a remote WiFi device according to the prior art.

Referring now to FIG. 2, for example only, the interference between WiMAX and WiFi communications of the device 100 is discussed in detail. The device 100 transmits and receives WiMAX frames using the first communication module 104. Each WiMAX frame comprises a downlink (DL) sub-frame that the device 100 receives and an uplink (UL) sub-frame that the device 100 transmits. Typically, the duration of the WiMAX frame is approximately 5 ms, where the duration of the DL sub-frame is approximately 3.5 ms, and the duration of the UL sub-frame is approximately 1.5 ms.

Additionally, the device 100 also receives and transmits 802.11 packets using the second communication module 106. Typically, when the device 100 receives an 802.11 packet, the second communication module 106 transmits an acknowledgement (ACK) to the remote WiFi device indicating that the 802.11 packet is received by the device 100. If the 802.11 packet is not received by the device 100, the second communication module 106 does not transmit the ACK to the remote WiFi device. When the remote WiFi device does not receive the ACK, the remote WiFi device lowers the data rate and retransmits the 802.11 packet.

If the remote WiFi device again does not receive the ACK from the device 100, the remote WiFi device again lowers the data rate and retransmits the 802.11 packet. The remote WiFi device continues to lower the data rate until the device 100 receives the 802.11 packet as indicated by the ACK received from the device 100. If the ACK is not received after lowering the data rate below a predetermined threshold, the remote WiFi device drops the link to the device.

Occasionally, although the device 100 receives the packet while the device 100 is receiving the WiMAX DL sub-frame, the device 100 may not transmit the ACK to the remote WiFi device for various reasons. For example, the device 100 may not transmit the ACK because the device 100 is configured (e.g., by an arbiter) to not transmit data using the second communication module 106 when the device 100 is receiving WiMAX data. When the remote WiFi device does not receive the ACK, however, the remote WiFi device presumes that the device 100 did not receive the 802.11 packet. Accordingly, the remote WiFi device lowers the data rate, increases the packet duration, and retransmits the 802.11 packet.

If the device 100 is still receiving WiMAX data, the device 100 again may not transmit the ACK to the remote WiFi device. The remote WiFi device again lowers the data rate and retransmits the 802.11 packet. By now, the device 100 may be transmitting the WiMAX UL sub-frame instead of receiving the WiMAX DL sub-frame. Depending on the design of a radio-frequency (RF) front-end of the device 100 (not shown), the second communication module 106 may not receive the 802.11 packet when the first communication module 104 is transmitting data. Accordingly, the remote WiFi device may drop the link to the device 100 instead of lowering the data rate and retransmitting the 802.11 packet. Thus, the interference between the WiMAX and WiFi communications may adversely affect the performance of the device 100.

SUMMARY

A network device comprises a first communication module and a second communication module. The first communication module communicates with a first device using a first wireless communication standard. The first communication module receives data from the first device during a first time period and transmits data to the first device during a second time period. The second communication module communicates with a second device using a second wireless communication standard. The second communication module receives a block of packets from the second device during the first time period. The second communication module transmits an acknowledgement to the second device during the second time period when the block of the packets is received.

In other features, a method comprises communicating with a first device using a first wireless communication standard, receiving data from the first device during a first time period, and transmitting data to the first device during a second time period. The method further comprises communicating with a second device using a second wireless communication standard and receiving a block of packets from the second device during the first time period. The method further comprises transmitting an acknowledgement to the second device during the second time period when the block of the packets is received.

In still other features, a network device comprises a first communication means for communicating with a first device using a first wireless communication standard and a second communication means for communicating with a second device using a second wireless communication standard. The first communication means receives data from the first device during a first time period and transmits data to the first device during a second time period. The second communication means receives a block of packets from the second device during the first time period. The second communication means transmits an acknowledgement to the second device during the second time period when the block of the packets is received.

In other features, the first wireless communication standard includes one of Worldwide Interoperability for Microwave Access (WiMAX), Third Generation Partnership Project (3GPP) Long Term Evolution (LTE), or Ultra Mobile Band (UMB), and Bluetooth® standards. The second wireless communication standard includes one of I.E.E.E. 802.11 standards.

In other features, the second communication means transmits lengths of the first and second time periods to the second device. The second device transmits a request for the acknowledgment to the network device before the first time period ends. The second communication means transmits data during the second time period. The network device further comprises an antenna that the first and second communication means share when communicating with the first and second devices, respectively.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure relates to systems and methods for reducing the interference that may occur when the handheld wireless network device (device) communicates using collocated communication modules that use different communication standards (standards). Throughout the disclosure, the Worldwide Interoperability for Microwave Access (WiMAX) standard is used as an example only. The teachings of the present disclosure are applicable to other Fourth Generation (4G) standards and the Bluetooth® (BT) standard.

For example only, the device may communicate with the WiMAX base station (BS) and the remote wireless fidelity (WiFi) device using the WiMAX and WiFi standards, respectively. The device may transmit to the remote WiFi device a first time period during which the device receives the WiMAX downlink (DL) sub-frame and a second time period during which the device transmits the WiMAX uplink (UL) frame. Accordingly, the remote WiFi device may transmit 802.11 packets to the device during the first time period while the device receives the WiMAX DL sub-frame. The remote WiFi device may not transmit the 802.11 packets during the second time period when the device transmits the WiMAX UL sub-frame.

Specifically, the remote WiFi device may transmit a block or a burst of 802.11 packets to the device during the first time period without requiring the device to transmit the acknowledgement (ACK) for every 802.11 packet received. Instead, the remote WiFi device transmits the block of 802.11 packets using a block ACK, where the remote WiFi device expects to receive a block ACK from the device when the device receives the block of 802.11 packets.

The device may receive the block of the 802.11 packets while receiving the WiMAX DL sub-frame. The device does not transmit ACKs to the remote WiFi device for each 802.11 packet received in the block by the device. Instead, the device may transmit the block ACK to the remote WiFi device when the device receives the block of the 802.11 packets.

Before the end of the first time period or before the beginning of the second time period, the remote WiFi device may transmit a block ACK request (BAR) to the device. Subsequently, the device may transmit the block ACK to the remote WiFi device when the device transmits the WiMAX UL frame during the second time period. The device transmits the block ACK to the remote WiFi device if the device received the 802.11 packets transmitted by the remote WiFi device. When the remote WiFi device receives the block ACK, the remote WiFi device determines that the device received the block of the 802.11 packets transmitted by the remote WiFi device.

Alternatively, the remote WiFi device may not transmit the BAR. Instead, the remote WiFi device and the device may be preconfigured such that the device transmits the block ACK to the remote WiFi device during the second time period without requiring the remote WiFi device to transmit the BAR.

Thus, the interference is reduced by scheduling and receiving blocks of 802.11 packets while receiving WiMAX UL sub-frames, not transmitting ACKs for every 802.11 packet received, and transmitting block ACKs while transmitting WiMAX UL sub-frames. The interference decreases since the device transmits data concurrently using the WiMAX and WiFi standards during the first time period and receives data concurrently using the WiMAX and WiFi standards during the second time period.

Additionally, the system throughput increases. This is because the device receives the 802.11 packets in blocks during the first time period, and the device may transmit other 802.11 data packets in addition to transmitting the block ACK during the second time period.

Figure 3:
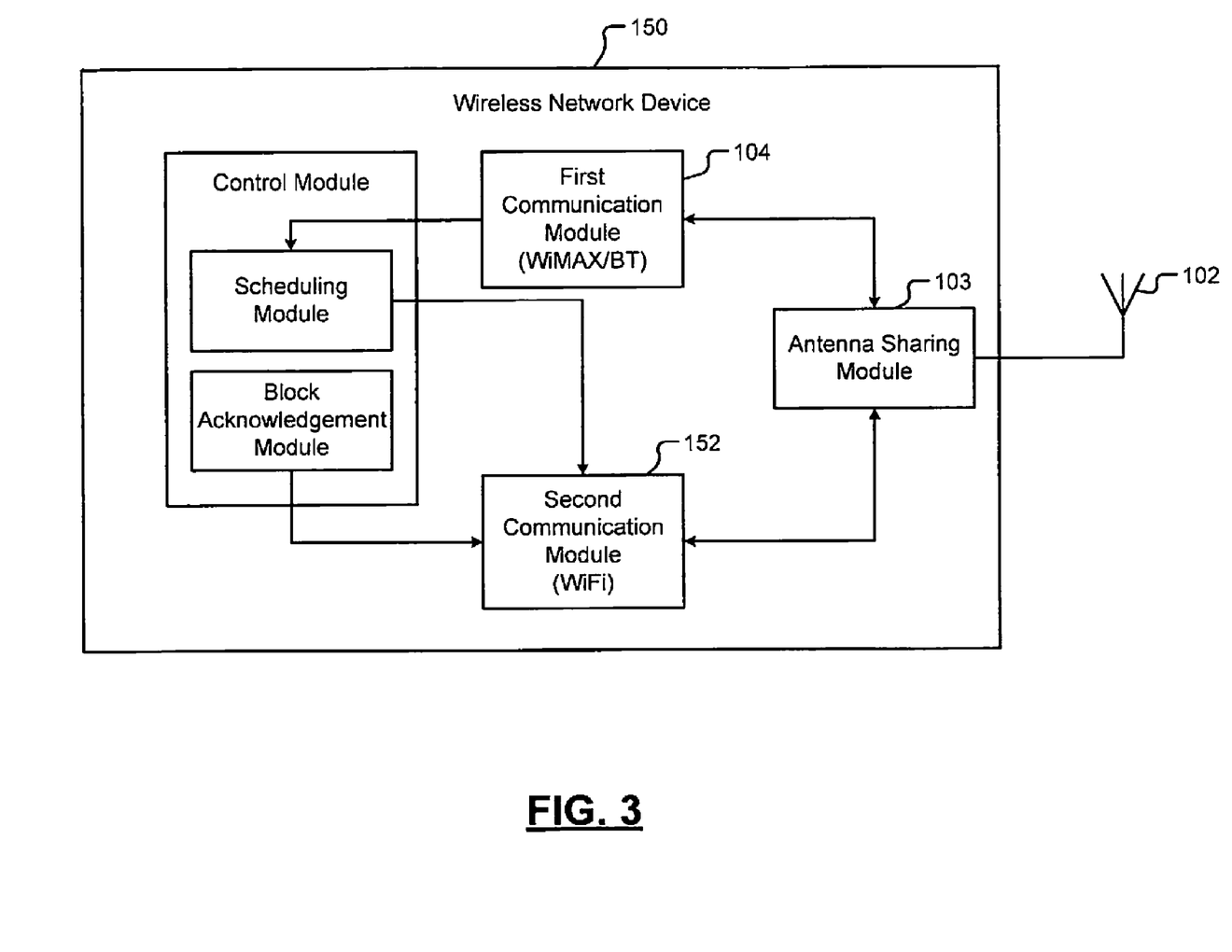
FIG. 3 is a functional block diagram of an exemplary wireless network device according to the present disclosure.
Figure 4:
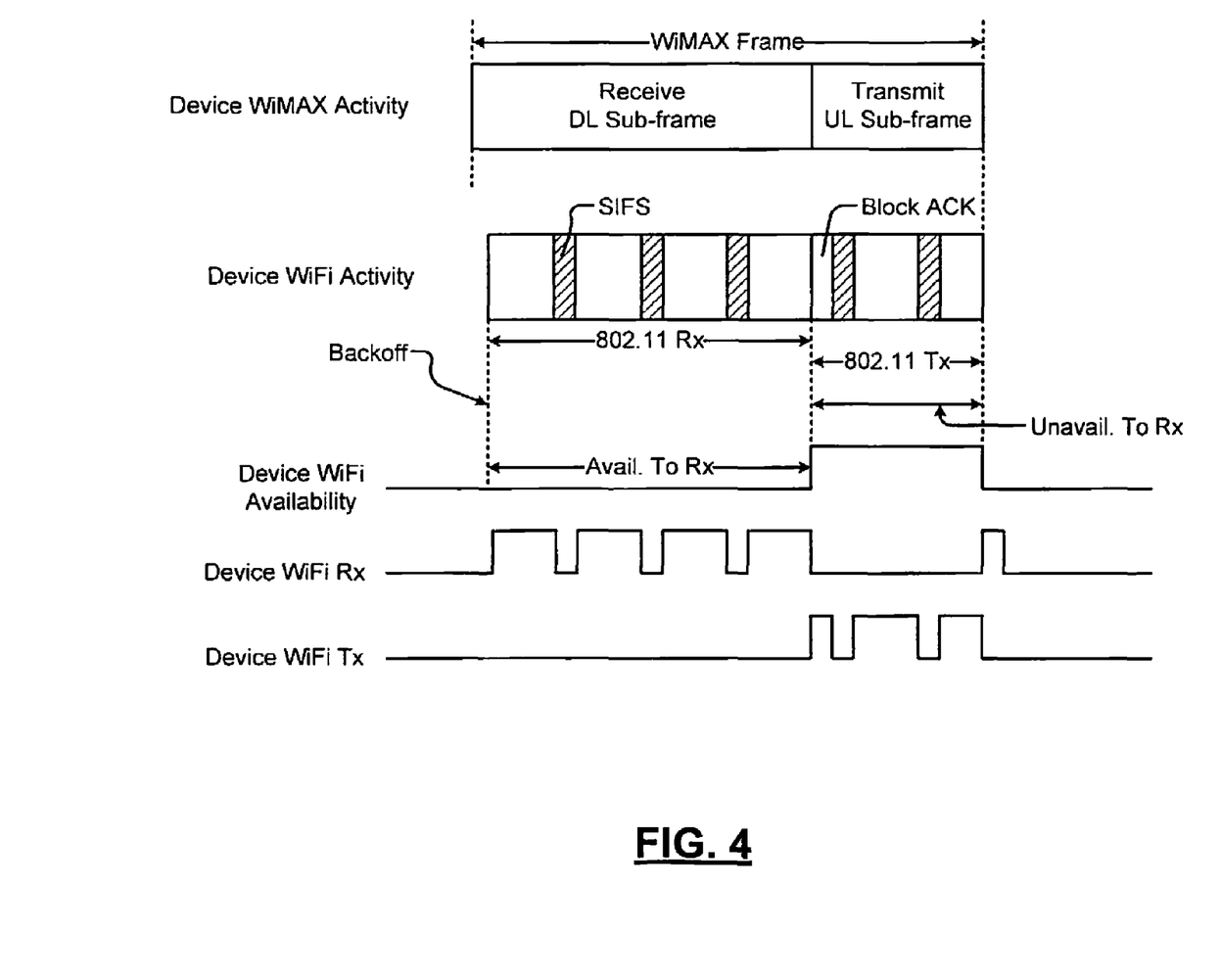
FIG. 4 is a timing diagram of signals exchanged by the wireless network device of FIG. 3, a WiMAX base station, and a remote WiFi device according to the present disclosure.

Referring now to FIGS. 3 and 4, for example only, an exemplary device 150 that communicates using WiMAX and WiFi standards according to the present disclosure is shown. FIG. 3 shows the exemplary device 150. FIG. 4 shows a timing diagram of signals communicated by the exemplary device 150, the WiMAX BS, and the remote WiFi device.

The exemplary device 150 comprises the antenna 102, the antenna sharing module 103, the first communication module 104, a second communication module 152, and a control module 154. For example only, the first communication module 104 communicates using the WiMAX standard. The second communication module communicates using one of the WiFi standards (e.g., I.E.E.E. 802.11n). Accordingly, the exemplary device 150 is said to communicate using collocated communication modules that use different communication standards. Although the antenna 102 is shown as a single antenna, the exemplary device 150 may comprise multiple antennas that may be shared by the first and second communication modules 104, 152.

The control module 154 comprises a scheduling module 156 and a block acknowledgement module 158. The scheduling module 156 determines the first time period during which the second communication module 152 may receive the block of the 802.11 packets from the remote WiFi device. Additionally, the scheduling module 156 determines the second time period during which the second communication module 152 may transmit the block ACK to the remote WiFi device.

The scheduling module 156 determines the first and second time periods based on the communication standard used by the first communication module 104. For example, when the first communication module 104 uses the WiMAX communication standard, the first time period may be approximately equal to the time during which the first communication module 104 receives the WiMAX DL sub-frame (e.g., 3.5 ms). Additionally, the second time period may be approximately equal to the time during which the first communication module 104 transmits the WiMAX UL sub-frame (e.g., 1.5 ms).

The second communication module 152 transmits the first and second time periods to the remote WiFi device. Accordingly, the remote WiFi device determines when the exemplary device 150 is available to receive the block of the 802.11 packets transmitted by the remote WiFi device and when the remote WiFi device may receive the block ACK from the exemplary device 150.

For example, the remote WiFi device determines that the exemplary device 150 is available to receive the block of the 802.11 packets during the first time period and that the exemplary device 150 may transmit the block ACK during the second time period. Accordingly, the remote WiFi device schedules the transmission of the block of the 802.11 packets to the exemplary device 150 based on the first and second time periods.

Specifically, the remote WiFi device transmits the block of the 802.11 packets to the exemplary device 150 during the first time period. The 802.11 packets may conform to the I.E.E.E. 802.11 standard format used by the exemplary device 150 and the remote WiFi device. For example, the 802.11 packets may include medium access controller (MAC) service data unit (MSDU) packets, MAC protocol data unit (MPDU) packets, and so on. The 802.11 packets may be separated by a short inter-frame space (SIFS).

The block ACK module 158 generates a control signal when the second communication module 152 receives the block of the 802.11 packets from the remote WiFi device during the first time period. The block ACK module 158 inputs the control signal to the second communication module 152. The second communication module 152, in turn, transmits the block ACK to the remote WiFi device when the first communication module 104 transmits the WiMAX UL sub-frame during the second time period.

Figure 5:
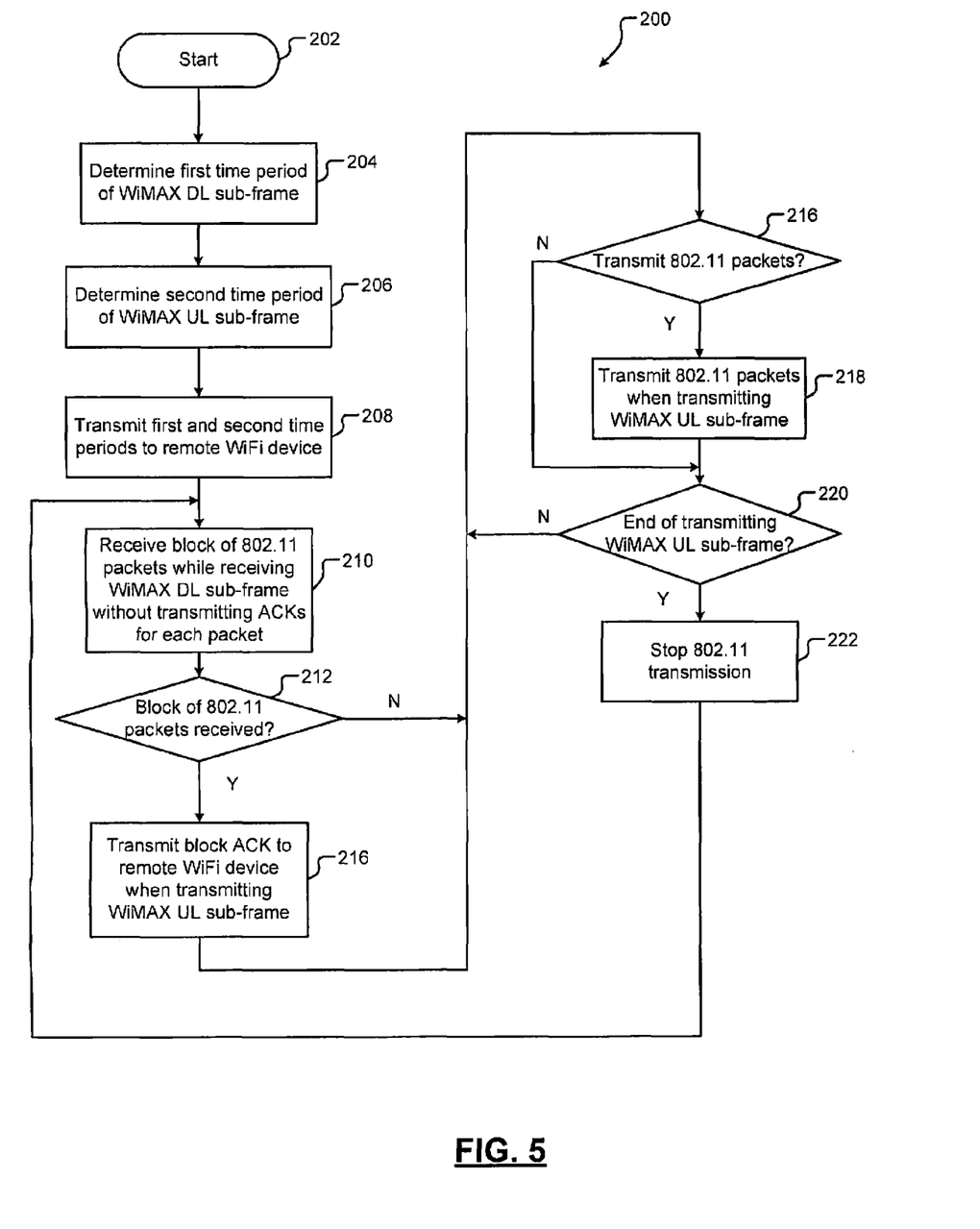
FIG. 5 is a flowchart of an exemplary method for reducing interference when the wireless network device of FIG. 3 communicates using multiple communication standards according to the present disclosure.

Referring now to FIG. 5, steps of a method 200 for reducing interference while communicating using multiple communication standards are shown. Control begins at step 202. Control determines the first time period of the WiMAX DL sub-frame in step 204. Control determines the second time period of the WiMAX UL sub-frame in step 206. Control transmits the first and second time periods to the remote WiFi device in step 208.

In step 210, control receives the block of the 802.11 packets from the remote WiFi device while receiving the WiMAX DL sub-frame from the WiMAX BS. Control does not transmit ACKs to the remote WiFi device for each of the 802.11 packets received in the block in step 210. Control determines in step 212 whether the block of the 802.11 packets were received. If the result of step 212 is true, control transmits the block ACK to the remote WiFi device while transmitting the WiMAX UL sub-frame in step 214.

Thereafter, or if the result of step 212 is false, control determines in step 216 whether any 802.11 packets are to be transmitted. If the result of step 216 is true, control transmits 802.11 packets while transmitting the WiMAX UL sub-frame in step 218. Thereafter, or if the result of step 216 is false, control determines in step 220 whether the transmission of the WiMAX UL sub-frame is complete. If the result of step 220 is false, control returns to step 216. If the result of step 220 is true, control stops the 802.11 transmission in step 222, and control returns to step 210.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network device comprising:
    a first communication module configured to
        communicate with a first device using a first wireless communication standard,
        receive data from the first device during a first time period, and
        transmit data to the first device during a second time period; and
    a second communication module configured to
        communicate with a second device using a second wireless communication standard,
        receive a block of packets from the second device during the first time period without transmitting an acknowledgement for each packet of the block of packets, and
        subsequent to the block of packets being received, transmit a single acknowledgement to the second device during the second time period, wherein the single acknowledgment corresponds to an acknowledgement of receipt of the block of packets.

2. The network device of claim 1, wherein the first wireless communication standard includes one of Worldwide Interoperability for Microwave Access (WiMAX), Third Generation Partnership Project (3GPP) Long Term Evolution (LTE), Ultra Mobile Band (UMB), and Bluetooth® standards.

3. The network device of claim 2, wherein the second wireless communication standard includes one of I.E.E.E. 802.11 standards.

4. The network device of claim 1, wherein the second communication module is configured to transmit data indicating lengths of the first time period and the second time period to the second device.

5. The network device of claim 1, wherein the second device is configured to transmit a request for the single acknowledgment to the network device before the first time period ends.

6. The network device of claim 1, wherein the second communication module is configured to transmit data to the second device during the second time period.

7. The network device of claim 1, further comprising an antenna shared by the first communication module and the second communication module to respectively communicate with the first device and the second device.

8. A method comprising:
    communicating with a first device using a first wireless communication standard;
    receiving data from the first device during a first time period;
    transmitting data to the first device during a second time period;
    communicating with a second device using a second wireless communication standard;
    receiving a block of packets from the second device during the first time period without transmitting an acknowledgement for each packet of the block of packets; and
    subsequent to the block of the packets being received, transmitting a single acknowledgement to the second device during the second time period, wherein the single acknowledgment acknowledges receipt of the block of packets.

9. The method of claim 8, wherein the first wireless communication standard comprises one of Worldwide Interoperability for Microwave Access (WiMAX), Third Generation Partnership Project (3GPP) Long Term Evolution (LTE), Ultra Mobile Band (UMB), and Bluetooth® standards.

10. The method of claim 9, wherein the second wireless communication standard comprises one of I.E.E.E. 802.11 standards.

11. The method of claim 8, further comprising transmitting data indicating lengths of the first time period and the second time period to the second device.

12. The method of claim 8, further comprising transmitting from the second device a request for the single acknowledgment before the first time period ends.

13. The method of claim 8, further comprising transmitting data to the second device during the second time period.

14. The method of claim 8, further comprising sharing an antenna to communicate with the first device and the second device.

* * * * *